United States Patent
McKnight et al.

(10) Patent No.: US 7,143,345 B2
(45) Date of Patent: Nov. 28, 2006

(54) METHOD AND SYSTEM FOR MULTIPLE LEVEL PARSING

(75) Inventors: David K. McKnight, Aurora (CA); Jeffrey C. Turnham, Markham (CA)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/285,992

(22) Filed: Oct. 31, 2002

(65) Prior Publication Data

US 2004/0088651 A1   May 6, 2004

(30) Foreign Application Priority Data

Oct. 24, 2001 (CA) .................................. 2359831

(51) Int. Cl.
  G06F 17/00   (2006.01)
  G06F 9/45    (2006.01)
(52) U.S. Cl. ..................................... 715/513; 717/142
(58) Field of Classification Search ........ 717/136–144; 715/513
See application file for complete search history.

(56) References Cited

U.S. PATENT DOCUMENTS

| | | | |
|---|---|---|---|
| 6,385,769 B1 * | 5/2002 | Lewallen | 717/1 |
| 6,405,365 B1 * | 6/2002 | Lee | 717/2 |
| 2003/0005001 A1 * | 1/2003 | Kataoka | 707/513 |
| 2003/0106049 A1 * | 6/2003 | Ungar | 717/143 |
| 2004/0073870 A1 * | 4/2004 | Fuh et al. | 717/143 |

* cited by examiner

*Primary Examiner*—Kakali Chaki
*Assistant Examiner*—Insun Kang
(74) *Attorney, Agent, or Firm*—Stephen R. Tkacs; Stephen J. Walder, Jr.; Jeffrey S. LaBaw (57) ABSTRACT

A system and method for parsing source code written in a high-level programming language at multiple levels may be performed to populate a tree data structure. To obtain information at lower levels, higher levels are parsed. Each level of parsing is performed as a separate stage with the results of higher levels being used to feed parsing at lower levels. The system and method of the present invention provide for parsing at a requested level, not parsing to a lower level than requested.

59 Claims, 5 Drawing Sheets

METHOD AND SYSTEM FOR MULTIPLE LEVEL PARSING

FIELD OF THE INVENTION

The present invention relates to parsing and more specifically to parsing for creating an overview of a hierarchically structured text.

BACKGROUND OF THE INVENTION

Display of source code information in a tree structure is an easy method for obtaining an overview of the source code. Such a display is created by first parsing the source code to extract relevant information and then analyzing the information to structure the display.

Display of source code information to a user must take into consideration various aspects regarding the parsing of the source code and its eventual display. The depth of parsing affects the performance of a parser. Different granularity levels, or depths, of parsing result in a different amount of information being produced for display. Coarse grained parsing may, for example, produce information about the different classes in a set of object oriented source code, as well as information about their relationships with one another. Medium grained parsing may parse the body and get a list of variables and methods for each class. Finer grained parsing may gather information such as statements, expressions, declarations and type specifiers allowing more detailed information about the type, source, and uses for variables and methods. As the granularity of the parsing decreases (i.e. from coarse grained to finer grained) there is an increase in the amount of information that is extracted from the source code and the amount of analysis required to format the information for display. With the increase in information and analysis comes an increase in processing power and time required to perform the parsing.

The degree to which a parser tolerates errors is another important consideration during design of the parser. With decreasing granularity of a parser there is a corresponding decrease to error tolerance. The more information a parser gathers the more likely it is that errors will adversely affect the gathering of information since simple syntactical errors cannot be as easily skipped with a decreased parsing granularity. For parsers using only a single granularity a simple syntactical error at a low level (e.g. an incomplete variable definition) will adversely affect parsing and display of higher level information (e.g. function definitions).

Another consideration for a parser is how the information determined from the source code is stored, thus the basic structure of the tree that is created from the source code information is considered.

Traditionally parsers are classified in according to the granularity level at which the parser operates. Three exemplary granularity levels are coarse, medium and fine. Coarse parsing works at the highest level gathering summary information about a source code file. Medium parsing involves examining the different components of each source code file (e.g. functions, classes, etc.) and summarizing these components. Fine parsing gathers a detailed summary about different elements (e.g. variables names, etc.) in each component in a source code file.

SUMMARY OF THE INVENTION

A system and method for parsing source code written in a high-level programming language at multiple levels may be performed to populate a tree data structure. To obtain information at lower levels, higher levels must be parsed. Each level of parsing is performed as a separate stage with the results of higher levels being used to feed parsing at lower levels. The system and method of the present invention provide for parsing at a requested level, not parsing to a lower level than requested.

In the case where only the highest depth is being parsed, after such parsing has been completed the source code may continue to be processed. The additional tokenizing and parsing may occur automatically after the initial display as a background process. Alternatively, in the case where there is a large amount of higher level (or same level) information, a user may request lower level (or same level) information for a branch of the tree that has not been parsed, even if the complete tree has not yet been formed. Parsing to satisfy the request may be made as a priority that begins after the request is received. The sequential parsing may continue as a background process with the parsing for the request taking priority. Thus, any errors occurring at lower levels will not adversely affect the gathering of higher level information.

In accordance with one aspect of the present invention there is provided a method of parsing a hierarchically structured text to a requested depth, the hierarchically structured text having two levels, each level being identifiable by definition information with start information and end information, the requested depth being one of the two levels, said method comprising: (A) searching a search text from said hierarchically structured text at a parse level to detect start information for a search level, said parse level being one of the two levels of the hierarchically structured text and being at least as high as said requested depth, said search level being lower than said parse level; (B) locating end information corresponding to detected start information after start information for said search level is detected; (C) holding information from said search text located between said detected start information and corresponding located end information; and (D) repeating steps (A) to (C) with held information as said search text and using said search level from said held information as said parse level until said parse level corresponds with the requested depth.

In accordance with another aspect of the present invention there is provided a method of constructing a hierarchical data structure from a hierarchically structured text having two levels, each level being identifiable by definition information with start information and end information, said method comprising: (A) placing information on a search text from the hierarchically structured text in the data structure; (B) searching said search text at a parse level to detect start information for a search level, said parse level being one of the two levels of the hierarchically structured text, said search level being lower than said parse level; (C) locating end information corresponding to detected start information after start information for said search level is detected; (D) placing intermediate information from said search text between said detected start information and located end information in the date structure as an entity relating to saved information on said search text; and (E) repeating steps (B) to (D) with saved intermediate information as said search text and using said search level from said saved intermediate text as said parse level.

In accordance with a further aspect of the present invention there is provided a system for parsing a hierarchically structured text to a requested depth, the hierarchically structured text having two levels, each level being identifiable by definition information with start information and end information, the requested depth being one of the two levels, said system comprising: a parser for searching a search text from the hierarchically structured text at a parse level to detect start information and locating end information for a search level, said parse level being one of the two levels of the hierarchically structured text and being at least as high as said requested depth, said search level being lower than said parse level; a storage for holding information from said search text located between detected start information and corresponding located end information; and a parse manager for coordinating said parse level, said search level and said search text used by said parser to search at an incrementally lower level of the two levels of the hierarchically structured text until said parse level corresponds with the requested depth.

In accordance with yet another aspect of the present invention there is provided a system for constructing a hierarchical data structure from a hierarchically structured text having two levels, each level being identifiable by definition information with start information and end each level being identifiable by definition information with start information and end information, said system comprising: a parser for searching a search text from the hierarchically structured text at a parse level to detect start information and locating end information for a search level, said parse level being one of the two levels of the hierarchically structured text and being at least as high as said requested depth, said search level being lower than said parse level; a parse manager for coordinating said parse level, said search level and said search text used by said parser to search at an incrementally lower level of the two levels of the hierarchically structured text until said parser level corresponds with the requested depth; and a storage for placing information on said parse level and information on said search level as related entities in the data structure.

In accordance with an additional aspect of the present invention there is provided a computer readable medium having stored thereon computer-executable instructions for parsing a hierarchically structured text to a requested depth, the hierarchically structured text having two levels, each level being identifiable by definition information with start information and end information, the requested depth being one of the two levels, the computer-executable instructions comprising: (A) searching a search text from said hierarchically structured text at a parse level to detect start information for a search level, said parse level being one of the two levels of the hierarchically structured text and being at least as high as said requested depth, said search level being lower than said parse level; (B) locating end information corresponding to detected start information after start information for said search level is detected; (C) holding information from said search text located between said detected start information and corresponding located end information; and (D) repeating steps (A) to (C) with held information as said search text and using said search level from said held information as said parse level until said parse level corresponds with the requested depth.

In accordance with a further aspect of the present invention there is provided a computer readable medium having stored thereon computer-executable instructions for constructing a hierarchical data structure from a hierarchically structured text having two levels, each level being identifiable by definition information with start information and end information, said computer-executable instructions comprising: (A) placing information on a search text from the hierarchically structured text in the data structure; (B) searching said search text at a parse level to detect start information for a search level, said parse level being one of the two levels of the hierarchically structured text, said search level being lower than said parse level; (C) locating end information corresponding to detected start information after start information for said search level is detected; (D) placing intermediate information from said search text between said detected start information and located end information in the date structure as an entity relating to saved information on said search text; and (E) repeating steps (B) to (D) with saved intermediate information as said search text and using said search level from said saved intermediate text as said parse level.

Since the information in a tree formed from source code may have many different uses, the depth of parsing required may vary depending on the intended use of the tree. The ability to parse source code at different granularities would allow for faster processing as only the information required for a certain task needs to be parsed. Thus finer grained parsing need not be performed if the information from coarse grained parsing is sufficient.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS OF THE PRESENT INVENTION

Figure 1:
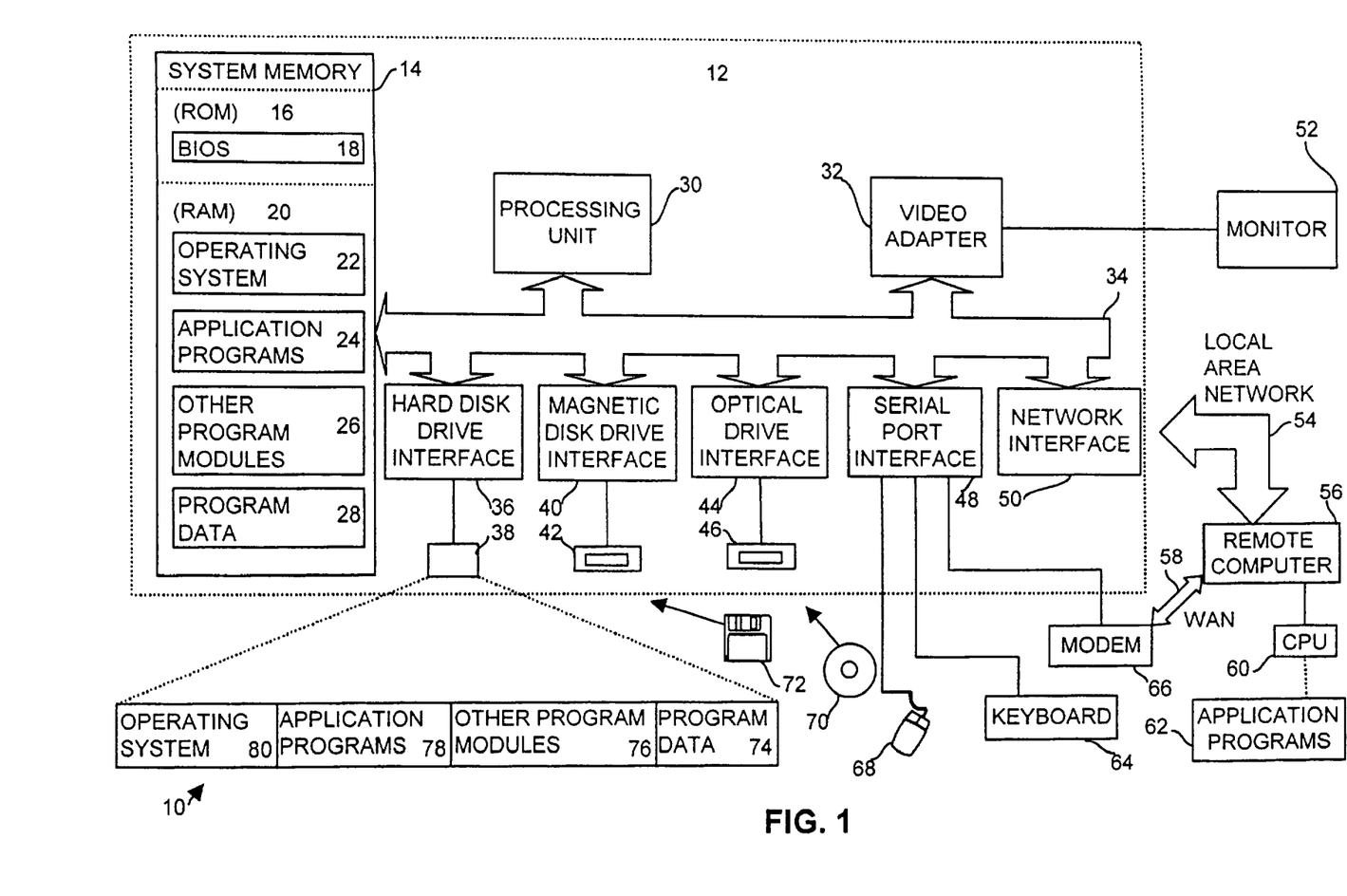
FIG. 1 is a schematic diagram depicting a computing environment according to embodiments of the present invention.

FIG. 1 and the associated description represent an example of a suitable computing environment 10 in which the present invention may be implemented. While the invention will be described in the general context of computer-executable instruction of a computer program that runs on a personal computer, the present invention can also be implemented in combination with other program modules.

Generally, program modules include routines, programs, components, data structures and the like that perform particular tasks or implement particular abstract data types. Further, the present invention can also be implemented using other computer system configurations, including hand-held devices, multiprocessor systems, microprocessor-based or programmable consumer electronics, minicomputers, mainframe computers, and distributed computing environments where program modules may be located in both local and remote memory storage devices.

With reference to FIG. 1, the present invention may be implemented within a general purpose computing device in the form of a conventional personal computer 12, including a processing unit 30, a system memory 14, and a system bus 34 that couples various system components including the system memory 14 to the processing unit 30. The system memory 14 includes read only memory (ROM) 16 and random access memory (RAM) 20.

A basic input/output system 18 (BIOS), containing the basic routines that help to transfer information between elements within the personal computer 12 (e.g. during start-up) is stored in ROM 16. The personal computer 12 further includes a hard disk drive 38 for reading from and writing to a hard disk (not shown), a magnetic disk drive 42 for reading from or writing to a removable magnetic disk 72, and an optical disk drive 46 for reading from or writing to a removable optical disk 70 such as a CD ROM or other optical media, all of which are connected to the system bus 34 by respective interfaces 36, 40, 44. The drives and their associated computer-readable media provide nonvolatile storage of computer readable instructions, data structures, program modules and other data for the personal computer 12. Although the exemplary environment described herein employs certain disks, it should be appreciated by those skilled in the art that other types of computer readable media for storing data may also be employed.

A number of program modules may be stored on the disks 72, 70, ROM 16 or RAM 20, including an operating system 22, one or more application programs 24, other program modules 76, and program data 74. Commands and information may be entered into the personal computer 12 through input devices (e.g. a keyboard 64, pointing device 68, a microphone, joystick, etc.). These input devices may be connected to the processing unit 30 through a serial port interface 48, a parallel port, game port or a universal serial bus (USB). A monitor 52 or other type of display device is also connected to the system bus 34 via an interface, such as a video adapter 32.

The personal computer 12 may operate in a networked environment using logical connections to one or more remote computers 56, such as another personal computer, a server, a router, a network PC, a peer device or other common network node. The logical connections depicted in FIG. 1 include a local area network (LAN) 54 and a wide area network (WAN) 58. Such networking environments are commonplace in offices, enterprise-wide computer networks, intranets and the Internet.

When used in a LAN networking environment, the personal computer 12 is connected to the local network 54 through a network interface or adapter 50. When used in a WAN networking environment, the personal computer 12 typically includes a modem 66 connected to the system bus 34 via the serial port interface 48 or other means for establishing a communications over the wide area network 58, such as the Internet. The operations of the present invention may be distributed between the two computers 12, 56, such that one acts as a server and the other as a client (see FIG. 2). Operations of the present invention for each computer 12, 56 (client and server) may be stored in RAM 20 of each computer 12, 56 as application programs 24, other program modules 26, or on one of the disks 38, 42, 46. It will be appreciated that the network connections shown are exemplary and other means of establishing a communications link between the computers may be used.

The present invention may operate in a variety of configurations. For example, the present invention may be embodied on any of the application programs 24, 78, 62 on the computer 12, disk 38 or remote computer 56, respectively.

Figure 2:
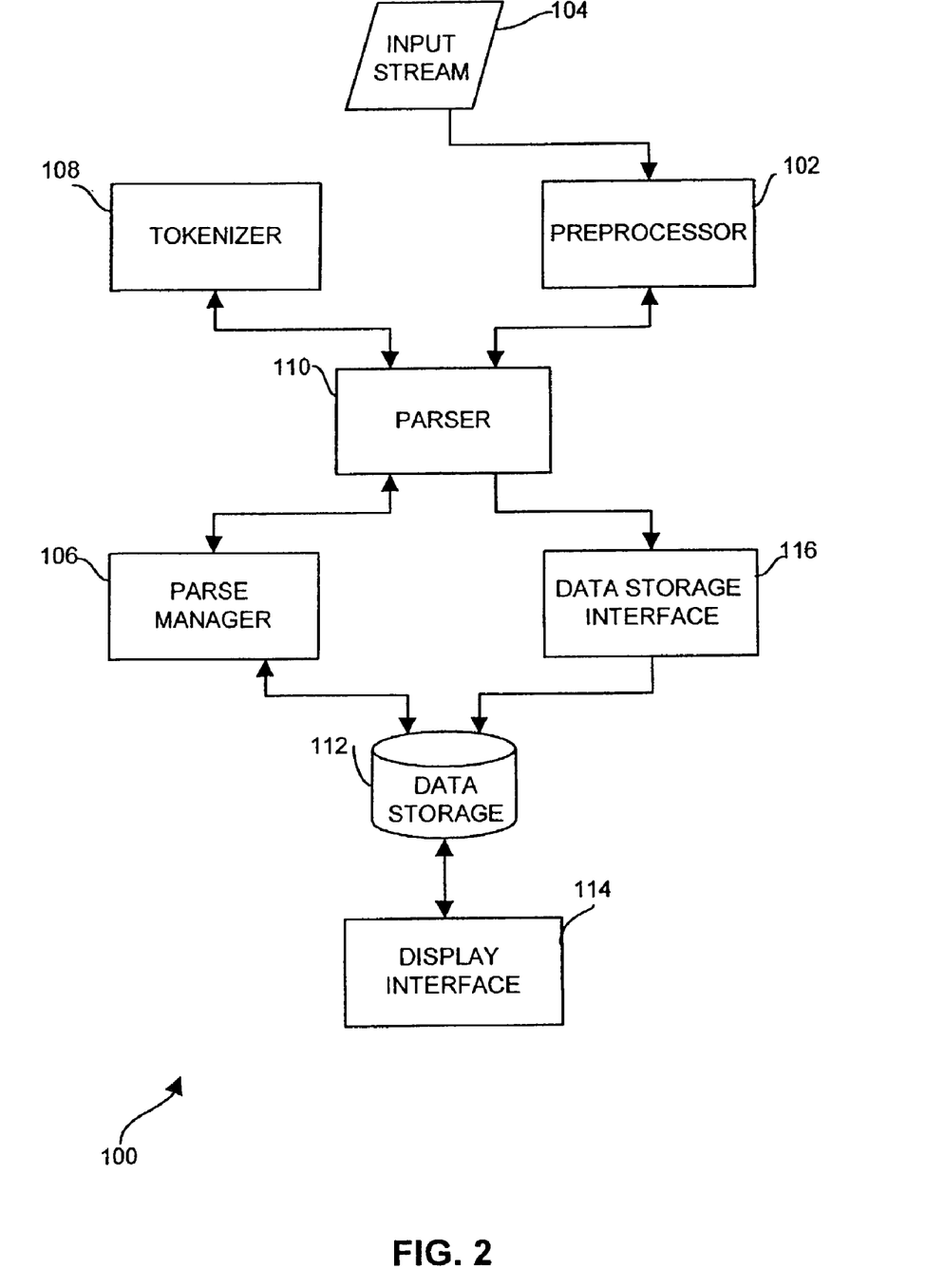
FIG. 2 is a system diagram of a multi-level parsing system according to an embodiment of the present invention.

FIG. 2 is a system diagram of a multi-level parsing system 100 according to an embodiment of the present invention. The multi-level parsing system 100 may be embodied as any of the application programs 24, 78, 62 from FIG. 1. The multi-level parsing system 100 parses source code to produce and display source code information at a number of different levels of depth (i.e. granularities). The text that is parsed may be any text that is hierarchically structured for which there is a known definition for each level of the hierarchy. An entire file of source code may be parsed or alternatively only a section of a file may be used. The text used for parsing may be considered to be a search text.

The different levels of depth of information that are displayed have corresponding different levels of parsing. The initiation and level of depth for any particular parse may be achieved either automatically or by a user request. A request for parsing may be in response to a user requesting to view new source code information at a certain level of depth or in response to a user requesting to view source code information already displayed at a lower level of depth than what is displayed. These requests are received at a display interface 114. Automatic parsing at a lower depth may be performed on source code that has already undergone a higher level of parsing. The different levels of parsing mimic how the source code information will be used and viewed (i.e. a tree structure).

The display interface 114 receives the request to display source code information or perform parsing of a search text of source code from which source code information can be derived. The display interface 114 may examine a data storage 112 to determine if the requested source code has been previously parsed at the requested level.

The data storage 112 contains information on entities that have been previously parsed.

These entities may be directories, files, etc. Each entity that has been parsed is stored in the data storage 112 as a data element. Data elements may contain other entities that may be stored as data elements in a tree data structure. For example, a directory may contain multiple files that have multiple classes with each class having multiple functions. The directory may be stored as a data element that contains multiple other data elements representing the files. Each of the file data elements would contain a data element for each class in the file which in turn would contain a data element for each function in the class. The data elements may be stored as individual data structures that are linked together to form a tree of data structures. Alternatively, a single tree data structure having many components or branches may be used to store the data elements.

Definition information in the data element representing the search text may include an identification of the source of the search text as well as the source creation date or the date of the last change. If the data storage 112 contains a requested data element, the display interface 114 compares the date of the last change of the source with that in the highest data element above the requested data element. If a discrepancy is found then parsing may be started from the highest level or a comparative search may be performed to locate the level(s) of the changes.

If parsing has already occurred then the display interface 114 can obtain the source code information for display from the data storage 112. If parsing of the requested source code at the requested level has not yet occurred then the display interface 114 sends a parse command through the data storage 112 to a parse manager 106. The parse manager 106 coordinates parsing of the source code at the requested level.

The parse manager 106 invokes a parser 110 in response to the parse command from the display interface 114. The invocation of the parser 110 includes an indication of the data element or entity that is to be parsed (e.g. the search text being a section of source code, an entire source code file, etc.). In the case where the search text to be parsed is a file or a directory, a file system manager (not shown) connected to the data storage 112 may create data elements for the file or directory in advance of a parse request. If the entity is a file or directory, the parser 110 invokes a preprocessor 102 to prepare the file for tokenizing.

Source code for which parsing of any level has not been performed must be read into the system 100. The source code enters the system 100 as an input stream 104 of characters into the preprocessor 102. The preprocessor 102 creates data elements in the data storage 112 for files or directories that have not been processed before (e.g. header files) and preprocesses source code. Each object in a set of source code will be represented as a data element when the source code is parsed, depending on the type of object and depth of parsing. The preprocessing of source code involves expanding macros, handling conditional source inclusions, replacing digraphs and trigraphs, etc. Data elements that represent high level entities (e.g. directories, files, classes, etc.) will contain source code that has been preprocessed but not parsed. When tokenizing and parsing occurs it is this preprocessed source code that is used.

When the preprocessing is complete, the parser 110 invokes a tokenizer 108 to tokenize the preprocessed source for the data element. The tokenizer 108 accepts a region of source code from the parser 112 and returns a series of tokens to the parser 110. The source code is tokenized to produce a logical or lexical expression analysis that yields comprehensible chunks (i.e. logical or lexical expressions or tokens) that can be analyzed to produce source code information for the creation of a tree representing the source code. These tokens are words or expressions that may be separated by recognized characters such as spaces and commas. The tokens returned to the parser 110 are a set of parser constants which are integer values corresponding to the different types of tokens (e.g. class, identifier, variable definition, etc.).

The parser 110 requests a token from the tokenizer 108 to start the parsing process. After a token for one region of code has been received by the parser 110 and that token is analyzed, the parser 110 requests another token from the tokenizer 108. The tokenizer 108 is a few tokens ahead of the requests from the parser 110 and is driven by the parser 110. The tokenizer 108 is ahead, for example, by 4 or 5 tokens, of what the parser 110 is currently parsing. The tokenizer 108 invokes its character reader to get the next token when the parser 110 makes a request for a token.

To reduce the tokenizing task for high level parsing (i.e. coarse grained parsing), the parser 110 has predefined definition information representing certain parsing levels. The definition information used by the parser 110 at a given time may be for any level lower than the level currently being parsed. The definition information has start information to denote the beginning of a different level and corresponding end information to denote the end of the level. The definition information may be a series of tokens representing the start and end information.

The parser 110 searches definition information for levels than that currently being parsed. The levels represent, for example, a file, class, function or structure. For example, if the source code is in the C++ language then the parser 110 will search for the class declaration. For coarse parsing the only information gathered may be, for example, class definitions (i.e. start information). After a class declaration is found the parser 110 searches for an open bracket, "{", to signify the beginning of the class body. When the open bracket is found the parser 110 sends a command to the tokenizer 108 to skip a class body. The tokenizer 108 reads the text being searched as a character string and the matching closing bracket, "}", (i.e. end information) is located. The next token that the parser 110 receives is the character after the class body.

The results of the parsing process are stored in the data storage 112 by the parser 110 via a data storage interface 116. The data storage 112 contains a tree of related data elements, a schema representing information about the data elements and an identification of various tools, e.g. the parse manager 106, that handle the commands run against data elements. The schema representing information about the data elements includes such information as types of commands that can be run against the data elements depending on the data element type and the types of references that apply between them. The data storage interface 116 is the mechanism by which the parser 110 and the preprocessor 102 can access information in the data storage 112. The data storage interface 116 can create data elements, search for and within data elements, delete data elements and perform other data management tasks.

The display interface 114 presents the data element tree for interaction with a user. The tree may be displayed showing, for example, the coarsest parsing level, allowing the user to request more detailed information as desired. The displayed interface 114 may display more detailed information found in the data storage 112 on request of the user. If the requested detailed information is not available the display interface 114 sends a parse command to the parser manager 106 through the data storage 112.

In the case where only the highest depth is being parsed, after such parsing has been completed the source code may continue to be processed. The additional tokenizing and parsing may occur automatically after the initial display as a background process. Alternatively, in the case where there is a large amount of higher level (or same level) information, a user may request lower level (or same level) information for a branch of the tree that has not been parsed, even if the complete tree has not yet been formed. Parsing to satisfy the request may be made as a priority that begins after the request is received. The sequential parsing may continue as a background process with the parsing for the request taking priority. Thus, any errors occurring at lower levels will not affect the gathering of higher level information.

Figure 3A:
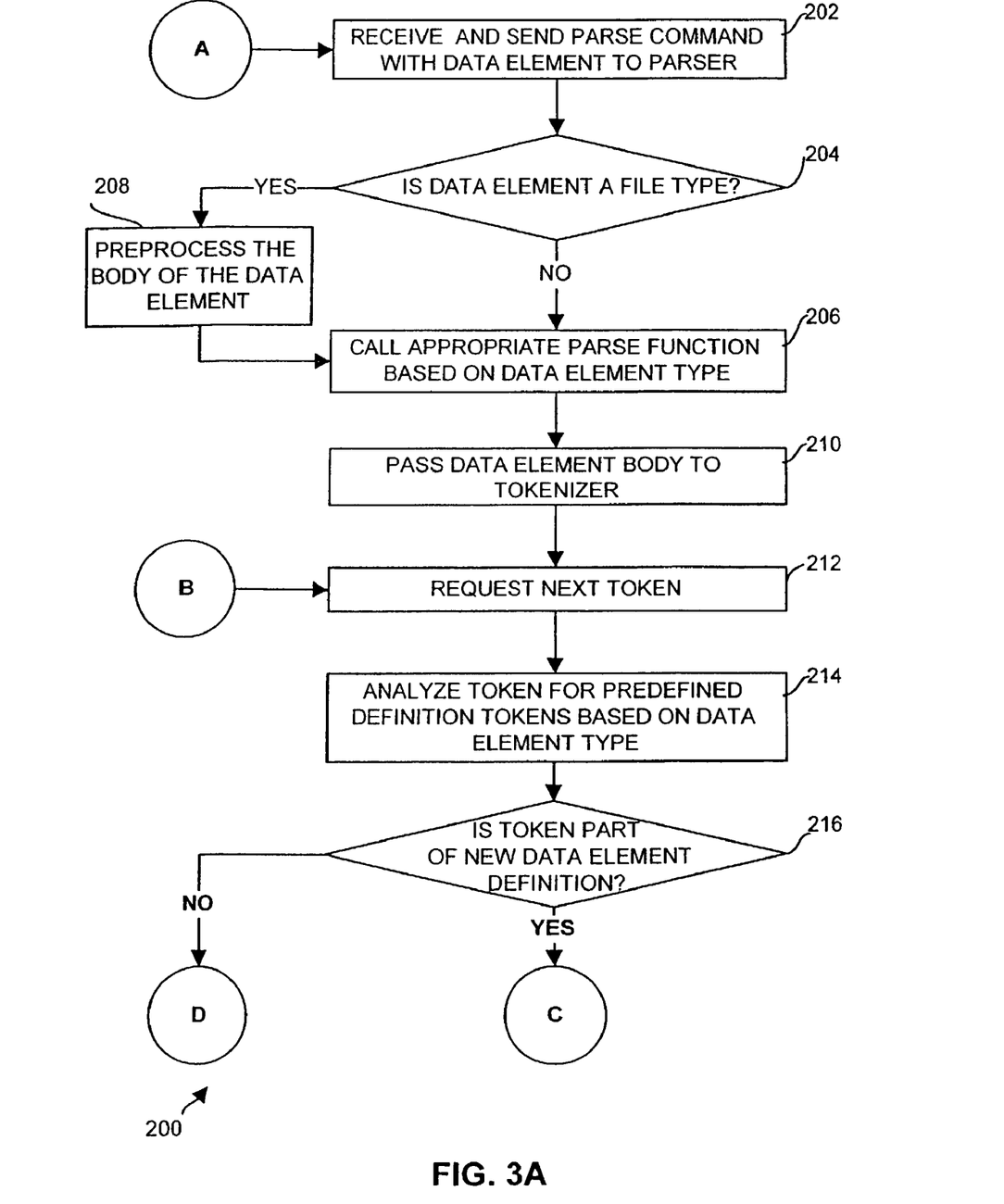
FIGS. 3A and B is a flow chart of the multi-level parsing system according to FIG. 2.
Figure 3B:
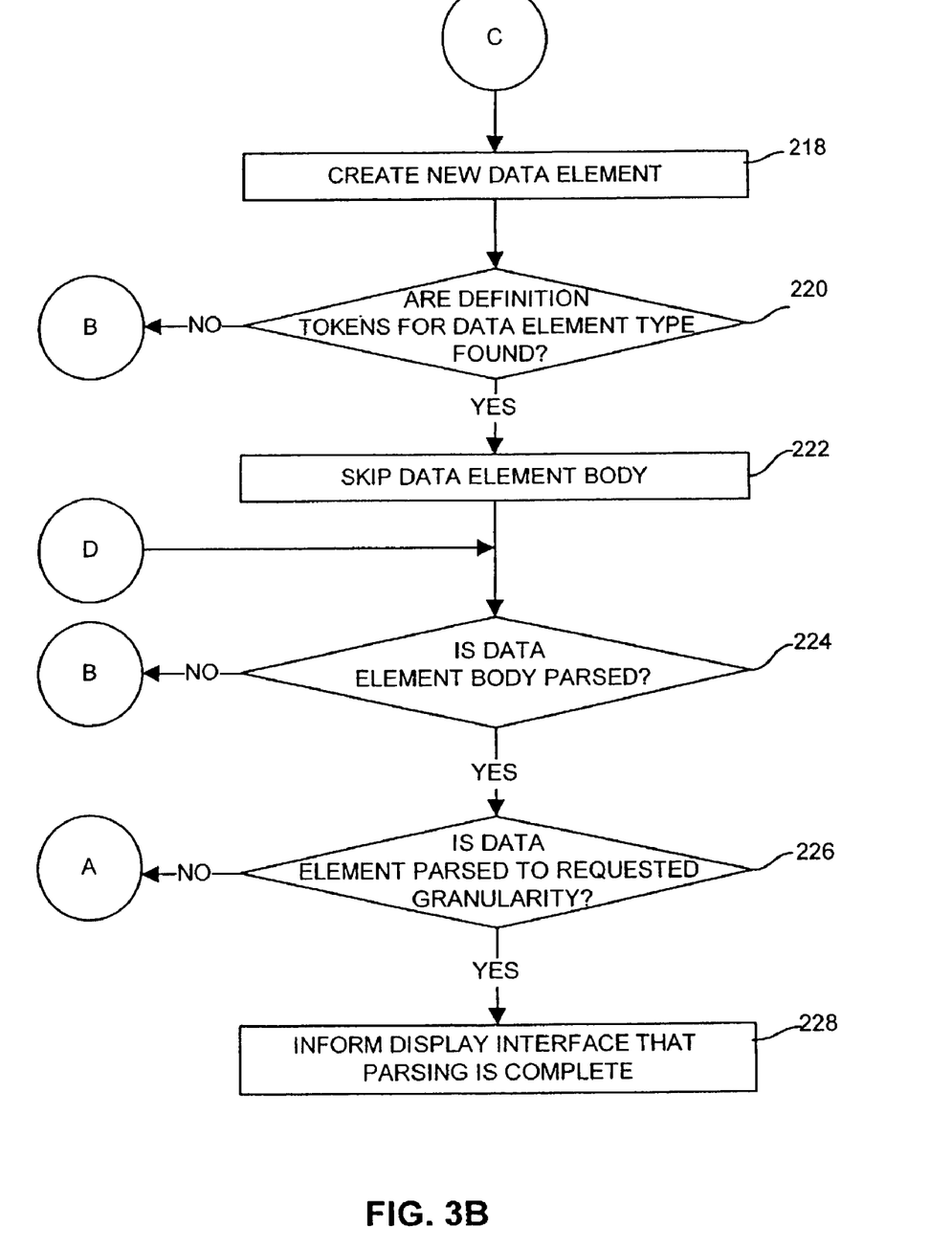

FIGS. 3A and B show a flow chart of the multi-level parsing system according to FIG. 2. A command to parse a data element is received from the display interface 114 by the parse manager 106 in step 202. The parse command is sent to the parser 110 with the data element to be parsed. If the data element represents a file, as determined in step 204, then the body of the data element is preprocessed in step 208. If the data element is not a file, or if the body of the file type data element has been preprocessed, then a call to the appropriate parse function based on the data element type is made in step 206. For example, if the data element is a class then a parse function for class is called or if the data element is a function then a parse function for function is called.

The parse function passes the data element body to the tokenizer 108 in step 210. The parse function initiates the tokenizing of the data element body by requesting a token in step 212. The parse function analyzes a token from the data element body passed to the tokenizer in step 210 to determine if it is part of a series of definition tokens for the expected type of data element in step 214. These expected data element types are types of elements that are expected to be found in the data element body being parsed (i.e. data elements of levels lower than the current parsing level). It is then determined in step 216 if the tokens form a new definition. For example, if the data element body being parsed is from a file then it is expected that the class type will be found. The tokens searched for in this class would be "class", the name of the class and the brackets denoting the class, "{" and "}". When a token signifying the start of a new data element of one of the expected types is found then a new data element is created in step 218. This new data element is created to reflect its relationship to the data element of the source code being parsed. If not all definition tokens for this new data element have been found, as determined in step 220, then the next token is requested and steps 212 to 220 are repeated until all definition tokens have been found (i.e. start information). Once all definition tokens have been found then the tokenizer 108 is told to skip the data element body in step 222. The tokenizer 108 recognizes the data element body according to an end definition token, such as "}" for a class data element. The tokenizer 108 will skip all source code contained with the definition tokens, e.g. between "{" and "}" for a class data type. This skipped source code is read by a character reader of the tokenizer 108 and stored as a string of characters in the new data element body.

After a new data element has been completely defined the parser 110 determines if the entire data element body has been parsed in step 224. If the data element body has not been completely parsed then steps 212 to 224 are repeated. If the entire data element body has been parsed then the parse manager 106 determines if the data element has been parsed to the granularity requested by the display interface 114 in step 226. If the requested granularity has not yet been reached then another parse command is sent to the parser 110 by the parse manager 106 with one of the data elements created during the most recent parsing and steps 202 to 226 are repeated. If the requested granularity has been reached then the parse manager 106 informs the display interface 114 in step 228 that parsing is complete and the data element tree can be displayed.

The following is an example, according to an embodiment of the present invention, of parsing a C++ file, FOO.C, at multiple granularities to form a summary tree.
//FOO.C
1 class A
2 {
3 int B( )
4 {
5 return 1;
6 }
7 }

When a parse of FOO.C is requested, a data element representing FOO.C is sent to the parse manager 106. The file data element is of a "file" type. The file data element may have been created by the file system manager. The body of a file type data element contains unprocessed source code that needs to be preprocessed.

Parsing of the data element representing FOO.C starts when a user submits a request to the display interface 114 to view details of the file. This request is received by the parse manager 106 and a parse command is sent to the parser 110 that includes the file data element (step 202). The parser 110 receives this file data element and notices that it is of type "file" and has not been preprocessed (step 204). The parser 110 invokes the preprocessor 102 to preprocess the body of the file data element and includes lines 1 to 7 of the FOO.C file into the file data element as part of the body (step 208).

After the body of the file data element has been preprocessed the parser 110 starts a file parsing function (step 206). The parser 110 passes the tokenizer 108 the preprocessed source code from body of the file data element (step 210).

The tokenizer 108 is repeatedly asked for tokens until there are none left (step 212). The parser 110 finds "class A" (steps 214 and 216) and creates a class data element for it (steps 218 and 220). The parser 110 then finds that there is a class body, so the entire body (lines 3–6) is stored as preprocessed source code of the class data element (steps 222). The tokenizer 108 skips the tokenizing work, and just matches the brackets, "{" "}" (step 224). That is the end of that parse job. The user would view a single class called A.

If a lower granularity is requested (step 226), a parse command is sent to the parser 10 from the parse manager 106 that includes the class data element (step 202). The parser 110 receives the class data element and finds that is of type "class" (step 204) and starts a class parsing function. The tokenizer 108 is re-initialized (step 210) with the info in the preprocessed source code of the class data element (lines 3–61), and is repeatedly asked for tokens until there are none left (step 212). The parser 110 finds "function B( )" (steps 214 and 216) and creates a function data element for it (steps 218 and 220). The parser 110 then finds that there is a function body, so the body of the function (line 5) is stored as preprocessed source code in the body of the function data element (step 222). That is the end of the parse job. The user would see the "class A" object expanded and the "function B( )" object underneath it (step 228).

If an even lower granularity is requested (step 226), a parse command is sent to the parser 110 from the parse manager 106 that includes the function data element (step 202). The parser 110 receives the function data element and finds that is of type "function" (step 204) and starts a function parsing function (step 206). The tokenizer 108 is re-initialized (step 210) with the info in the body of the function data element (line 5), and is repeatedly asked for tokens until there are none left (step 212). The parser 110 finds "return 1;" (steps 214 and 216) and creates a statement data element for it (steps 218 and 220). There is no body for the statement data element, so there is no information to be added as preprocessed source code to the body of the statement data element (step 222). That is the end of the parse job. The user would see the "function B( )" statement object expanded and the "return 1;" statement object underneath it.

If an even lower granularity is requested (step 226), a parse command is sent to the parser 110 from the parse manager 106 that includes the statement data element (step 202). The parser 110 finds that there is no preprocessed source code in the body of the statement data element for parsing (step 204 to 224). Since the data element is not of type "file" (in which case it would try and invoke the preprocessor 102), the parser 110 does nothing in response to the request.

Figure 4:
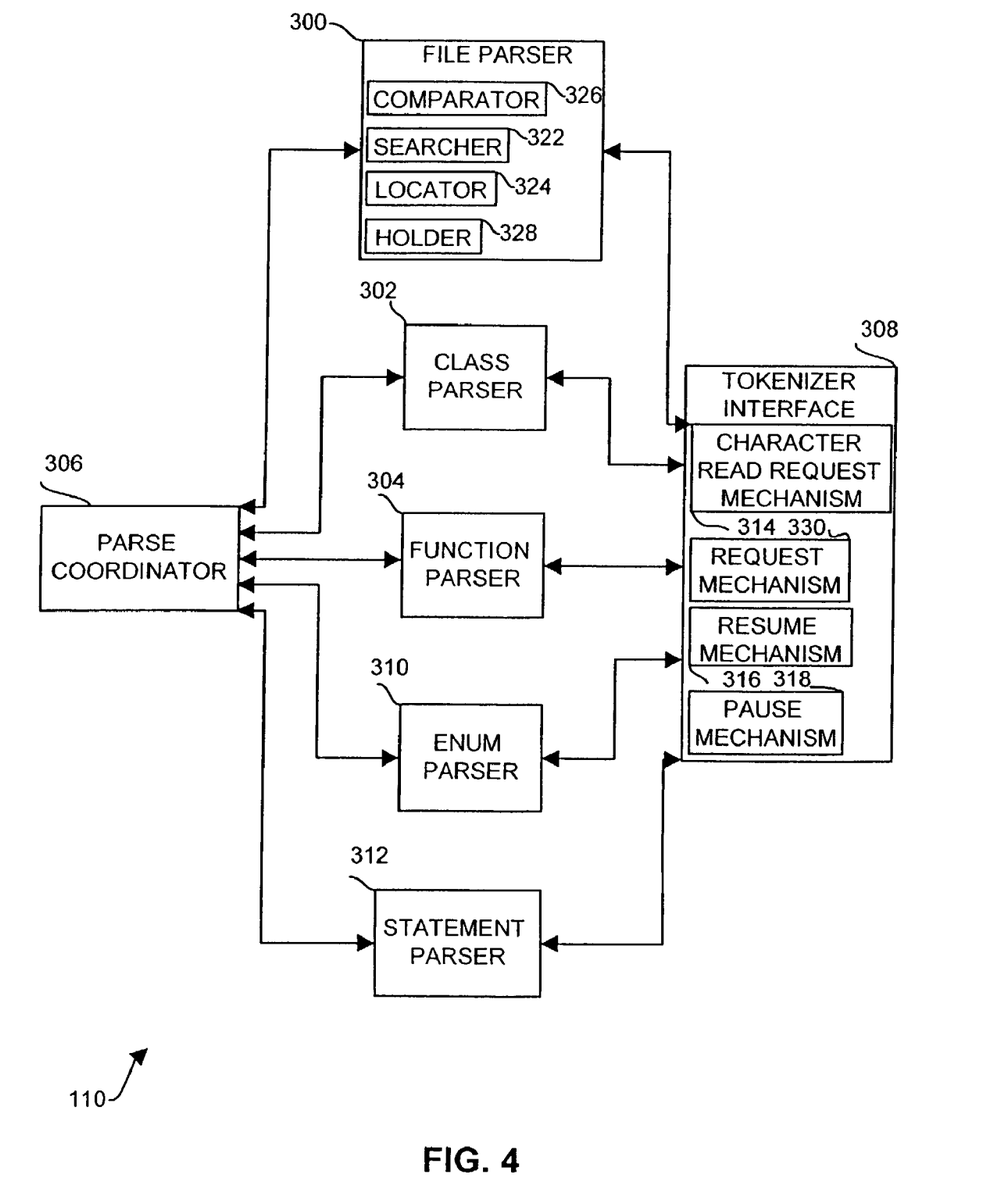
FIG. 4 is a system diagram of a parser of FIG. 2.

FIG. 4 is a system diagram of the parser 110 shown in FIG. 2. The parser 110 receives commands from the parse manager 106 to parse a data element at a parse coordinator 306. The parse coordinator 306 determines the type of data element provided in the parse command. The parse coordinator 306 determines if the body of the data element contains preprocessed source code. Based on the type of data element received, the parse coordinator 306 determines if the data element contains a body with source code that has not been preprocessed. For example, data elements representing files may have source code that has not been preprocessed. The parse coordinator 306 passes the data element to the preprocessor 102 where the source code may be preprocessed and stored in the body of the data element.

The parse coordinator 306 invokes an appropriate parse function specific to the type of data element. For a file data element a file parser 300 is invoked. For a class data element a class parser 302 is invoked. For a function data element a function parser 304 is invoked. For an data element representing an enumerated type an enum parser 310 is invoked. For a statement data element a statement parser 312 is invoked. If the data element is not file, class, function, enum type or statement, the parse coordinator 306 assumes that the data element does not contain a body having source code that can be parsed.

The different types of data elements and their associated parse functions determine the granularity of the parsing performed. For example, for a data element representing a file the file parse function 300 is invoked. The file parse function 300 performs coarse grained searching, looking for class definitions, etc.

The specific type parsers 300, 302, 304, 310, 312 each contain a searcher 322, a locator 324, a comparator 326 and a holder 328. Each of these components are shown only in the file parser 300 for simplicity. The searcher 322 receives an indication to start parsing, accepts the data element and passes it to a tokenizer interface 308. The tokenizer interface 308 requests tokens from the tokenizer 108 based on the preprocessed source code in the body of the data element in response to a request from the searcher 322 that invoked the tokenizer interface 308. The tokenizer interface 308 acts as a controller for all requests for tokens. The tokenizer interface 308 has a request mechanism 330 that is accessed by the searcher 322 to request a token. For a first request the request mechanism 330 passes the data element body to the tokenizer 108. The tokenizer interface 308 forwards the received token to the invoked specific type parser 300, 302, 304, 310, 312.

The invoked specific type parser 300, 302, 304, 310, 312 contains a series of predefined definition tokens that denote a definition of entities lower than the level represented by the data element. For example, the file parser 300 parses a file data element and contains definition tokens for a class. These class definition tokens may be, for example, "class" to denote the class name, "{" to denote the start of the class body and "}" to denote the end of the class body. The class parser 302 parses a class data element and contains definition tokens for a function and an enum. The function parser 304 parses a function data element and contains definition tokens for an enum and a statement. The enum parser 310 parses an enum data element and contains definition tokens for a statement. The statement parser 312 parses a statement data element and does not have definition tokens as it is not expected that statement data elements will have bodies with source code.

The searcher 322 accepts a token from the tokenizer interface 308 and a comparator 326 compares the token to the definition tokens contained in the invoked parser 300, 302, 304, 310, 312. When a definition token is found the searcher 322 determines if it is part of a data element currently being defined or if it is a new data element. If the token represents the start of a new data element then a new data element is created in the data storage 112 and another token is requested. If the definition token is part of a data element being defined, the invoked parser 300, 302, 304, 310, 312 determines if the token signifies the beginning of the new data element body.

If the token signifies the start of a data element body, the invoked parser 300, 302, 304, 310, 312 sends a command to the tokenizer interface 308 to forward to pause tokenizing. A pause mechanism 318 is invoked and tokenizing of the data element stops. A character read request mechanism 314 simultaneously requests the tokenizer to read the data element as a character string. The character string is passed to a locator 324 at the invoked parser 300, 302, 304, 310, 312 where end information is located denoting the end of the data element body. The character string is held by a holder 328 to be used for future parsing at lower levels. After the end information has been located, a resume mechanism 316 at the tokenizer interface 308 is used to resume tokenizing by notifying the searcher 322 that searching may continue. The searcher 322 then requests the next token.

After a data element body has been stored in the data element as preprocessed source code, the searcher 322 determines if the body of the data element being parsed has been completely parsed. If the data element body is parsed then the parsing coordinator 306 informs the parse manager 106 that the task has been completed; otherwise, the searcher 322 requests the next token.

The following is an example, according to an embodiment of the present invention of parsing an exemplary file containing the following information:
EMPLOYEE 'John Doe'
SALARY $100
ADDRESS 'Markham, Ont'
EMPLOYEE 'Jane Doe'
SALARY $200
ADDRESS 'Ottawa, Ont'

The valid tokens are first described. In this case there are 3 keywords: "EMPLOYEE", "SALARY" and "ADDRESS", and 2 types of data tokens, DataString and DataDollars. The definitions of the tokens would look like this:
TOKEN ID|TOKEN VALUE
(End-of-File)–1|"EOF"
(for EMPLOYEE) 0|"EMPLOYEE"
(for SALARY) 1|"SALARY"
(for ADDRESS) 2|"ADDRESS"
(for DataString) 3|"<some sequence of letters and whitespace>"
(for DataDollars) 4|"$<some sequence of numbers>"
(any other token) 5|"UNKNOWN TOKEN"

The tokenizer 108 reads a stream of characters and return tokens such as the ones shown below. First, a token class is created having only has 2 fields: id and value. The parser 110 makes successive calls to the tokenizer 108 to get tokens until we return the EOF (end-of-file) token. The list of Tokens that would be returned after successive calls to the tokenizer 108 are:#|Token id|Token Value
1|0|"EMPLOYEE"
2|3|"'John Doe'"
3|1|"SALARY"
4|4|"$100"
5|2|"ADDRESS"
6|3|"'Markham, Ont'"
7|0|"EMPLOYEE"
8|3|"'Jane Doe'"
9|1|"SALARY"
10|4|"$200"
11|2|"ADDRESS"
12|3|"'Ottawa, Ont'" The tokenizer 108 can "skip" the tokenizing work so that a data element body need not be tokenized before being stored as the body. The tokenizer 108 scans ahead from where tokenizing is currently occurring to find the next "EMPLOYEE" keyword. All the characters skipped are stored and returned to the parser 110.

The parser 110 repeatedly gets tokens from the Tokenizer 108 and checks to make sure the input is valid. These rules are defined in a grammar that may be as follows:

Input->EmployeeRecord(s)
EmployeeRecord->SalaryField or AddressField
SalaryField->Integer Data
AddressField->""""CharacterData""""
IntegerData-><some sequence of digits>
CharacterData-><some sequence of characters and whitespace>

Parsing the input is the coarsest level of parsing (similar to the file parser 300). Parsing the input takes the input data element and check for Employee Records. Parsing the input may perform the following tasks:
1. Get the next token.
2. If the token is the end of the file, go to 8.
3. If the token if not an "EMPLOYEE" token, go to 8.
4. (The token must be an "EMPLOYEE" token.)
   Get the next token.
5. If the token is not a data string, go to 8.
6. (The token must be a data string.)
   Create a data element under the Input data element with the following attributes:
   Type="Employee Record"
   Name=value of data string
   preprocessed source code=skipped Employee body
7. Goto 1
8. Finished Parsing the employee record is a finer level of parsing (similar to class parser 302). Parsing the employee record may perform the following tasks:
1. Get the next token.
2. If the token is "ADDRESS", go to 8.
3. If the token is not "SALARY", go to 12.
4. Get the next token.
5. If the token is not a DataDollars, go to 12.
6. Create a data element under the employee record with the following attributes:
   Type="Salary Field"
   Name=token value
7. Go to 12.
8. Get the next token.
9. If the token is not a DataString, go to 12.
10. Create a data element under the employee record with the following attributues:
    Type="Address Field"
    Name=token value
11. Go to 12.
12. Finished Multi-level parsing allows only the level of depth that is requested and required to be parsed. As lower depths require more detailed parsing, performing parsing in stages increases performance by only parsing to a particular level. This allows a user access to the source code information quickly without necessitating a lengthy wait for the most general of the information. Also, as the source code is only initially skimmed, to varying degrees, errors contained in the classes may be skipped over in the initial parsing levels.

Multi-level parsing provides flexible parsing. The system 100 may be implemented as a client/server system with the processing occurring on a server and the display occurring on a client. For example, all parsing may be performed on the server, the results of which may be stored in a database on the server. Source code information in the database may be retrieved by the client and formatted for display. As the higher depths of parsing are not dependent on the lower depths any changes may be source code may be easily incorporated into the source code information by re-performing the tokenizing and parsing to only those sections that were affected by the changes. Further, there is no dependence of the higher parsing depths on the lower parsing depths.

The system 100 for multi-level parsing may be used for any source code written in a high-level programming language that is structured and hierarchical. The individual parsing functions may be implemented specifically with expected syntax for each high-level programming language.

It is apparent to one skilled in the art that numerous modifications and departures from the specific embodiments described herein may be made without departing from the spirit and scope of the invention.

The invention claimed is:

1. A method of parsing a hierarchically structured text to a requested depth, said method comprising:
   receiving a command from a display interface to parse a hierarchically structured text having a plurality of levels, each level within the plurality of levels being identifiable by definition information with start information and end information, to a requested depth;
   searching a search text from said hierarchically structured text at a parse level to detect start information for a search level, said parse level being one of the plurality of levels of the hierarchically structured text and being at least as high as said requested depth, said search level being lower than said parse level;
   locating end information corresponding to detected start information after start information for said search level is detected;
   holding information from said search text located between said detected start information and corresponding located end information;
   determining whether the parse level corresponds to the requested depth;
   responsive to the parse level not corresponding to the requested depth, repeating said searching, said locating and said holding with held information as said search text and using said search level from said held information as said parse level; and
   responsive to the parse level corresponding to the requested depth, informimg the display interface that parding is complete, wherein held information remains unparsed.

2. The method according to claim 1 wherein said searching comprises:
   determining a first level for said parse level for searching said search text.

3. The method according to claim 2 wherein said searching further comprises:
   setting the hierarchically structured text as said search text;
   and wherein said determining comprises:
   setting said first level as a highest level of the plurality of levels of the hierarchically structured text.

4. The method according to claim 1 wherein said searching comprises:
   requesting logical expression analysis of said search text to provide logical expressions, each logical expression representing a lexical expression from said search text; and
   comparing received logical expressions to expected definition information for said search level.

5. The method according to claim 4 wherein said requesting logical expression analysis comprises:
   requesting a first logical expression;
   and said comparing received logical expressions comprises:

comparing said first logical expression to expected start information for said search level;
and wherein said searching a search text further comprises:
repeating said requesting logical expression analysis and said comparing received logical expressions to detect start information for said search level.

6. The method according to claim 4 wherein said locating end information comprises:
controlling requests for logical expression analysis according to detection of start information and location of end information; and
requesting reading of said search text as a character string to locate end information for said search level.

7. The method according to claim 6 wherein said controlling requests for logical expression analysis according to detection of start of information and location of end information comprises:
pausing said logical expression analysis after start information for said search level has been detected; and
resuming logical expression analysis after located end information.

8. The method according to claim 1 wherein said controlling requests for logical expression analysis according to detection of start of information and location of end information comprises:
requesting reading of said search text as a character string to locate end information for said search level after start information for said search level has been detected.

9. The method according to claim 4 wherein said requesting logical expression analysis of said search text to provide logical expressions comprises:
requesting a lexical analysis of said search text to yield tokens;
wherein said comparing received logical expressions to expected definition information for said search level is performed in accordance with tokens.

10. The method according to claim 1 wherein said searching a search text comprises:
storing definition information for said parse level in a database prior to searching;
and said holding information from said search text comprises:
storing definition information and said held information of said search level in said database as an entity related to said definition information for said parse level.

11. The method according to claim 10 wherein information for said parse level and said search level are stored as a tree data structure.

12. A method of constructing a tree data structure from a hierarchically structured text, said method comprising:
receiving a command from a display interface to parse a hierarchically structured text having a plurality of levels, each level within the plurality of levels being identifiable by definition information with start information and end information, to a requested depth;
placing information on a search text from the hierarchically structured text in the tree data structure in a data storage;
searching said search text at a parse level to detect start information for a search level, said parse level being one of the plurality of levels of the hierarchically structured text, said search level being lower than said parse level;
locating end information corresponding to detected start information after start information for said search level is detected;
placing intermediate information from said search text between said detected start information and located end information in the tree data structure as an entity relating to saved information on said search text;
determining whether the parse level corresponds to the requested depth;
responsive to the parse level not corresponding to the requested depth, repeating said searching, said locating and said placing with saved intermediate information as said search text and using said search level from said saved intermediate text as said parse level; and
responsive to the parse level corresponding to the requested depth, displaying the tree data structure at the display interface, wherein saved information within the tree data structure remains unparsed.

13. The method according to claim 12 wherein said searching further comprises:
setting the hierarchically structured text as said search text;
and said setting the hierarchically structured text as said search text comprises:
setting said parse level as a highest level of the plurality of levels of the hierarchically structured text.

14. The method according to claim 12 wherein said searching further comprises:
requesting logical expression analysis of said search text to provide logical expressions, each logical expression representing a lexical expression from said search text; and
comparing received logical expressions to expected definition information for said search level.

15. The method according to claim 14 wherein said requesting logical expression analysis of said search text to provide logical expressions comprises:
requesting a first logical expression;
and said comparing received logical expressions to expected definition information for said search level comprises:
comparing said first logical expression to expected start information for said search level;
and said searching further comprises:
repeating said requesting logical expression analysis of said search text to provide logical expressions and said comparing received logical expressions to expected definition information for said search level to detect start information for said search level.

16. The method according to claim 14 wherein said locating comprises:
controlling requests for logical expression analysis according to detection of start information and location of end information; and
requesting reading of said search text as a character string to locate end information for said search level.

17. The method according to claim 16 wherein said controlling requests for logical expression analysis according to detection of start information and location of end information comprises:
pausing said logical expression analysis after start information for said search level has been detected; and
resuming logical expression analysis after located end information.

18. The method according to claim 12 wherein said locating comprises:
requesting reading of said search text as a character string to locate end information for said search level after start information for said search level has been detected.

19. The method according to claim 14 wherein said requesting logical expression analysis of said search text to provide logical expressions comprises:

requesting a lexical analysis of said search text to yield tokens; and wherein said comparing received logical expressions to expected definition information for said search level is performed in accordance with tokens.

20. A system for parsing a hierarchically structured text to a requested depth, said system comprising:

a display interface for receiving a command to parse a hierarchically structured text having a plurality of levels, each level within the plurality of levels being identifiable by definition information with start information and end information, to a requested depth;

a parser for searching a search text from the hierarchically structured text at a parse level to detect start information and locating end information for a search level, said parse level being one of the two levels of the hierarchically structured text and being at least as high as said requested depth, said search level being lower than said parse level;

a storage for holding information from said search text located between detected start information and corresponding located end information; and a parse manager for coordinating said parse level, said search level and said search text used by said parser to search at an incrementally lower level of the two levels of the hierarchically structured text until said parse level corresponds with the requested depth, wherein the parse manager, responsive to a determination that the parse level corresponds to the requested depth, informs the display interface that parsing is complete, wherein held information remains unparsed.

21. The system according to claim 20 wherein said parser comprises:

a plurality of parse functions, each of said plurality of parse functions having a corresponding level being one of the plurality of levels of the hierarchically structured text.

22. The system according to claim 21 wherein each of said plurality of parse functions comprises:

means for searching said search text at said corresponding level to detect start information for a level lower than said corresponding level; and means for locating end information corresponding to detected start information.

23. The system according to claim 22 wherein said parser further comprises:

a parse coordinator for determining a function level being one of the plurality of levels of the hierarchically structured text corresponding to said parse level and invoking one of said plurality of parse function corresponding to said function level.

24. The system according to claim 20 wherein said parse manager comprises:

initializing means for determining a first level for said parse level for said parser, said first level being one of the plurality of levels of the hierarchically structured text.

25. The system according to claim 22 wherein said parser further comprises:

a logical expression analyzer interface in communication with a logical expression analyzer for requesting and receiving a logical expression analysis of said search text to provide logical expressions, each logical expression representing a lexical expression from said search text;

and said means for searching comprises:

a comparator for comparing received logical expressions to expected definition information for said search level.

26. The system according to claim 25 wherein said logical expression analyzer interface comprises:

a tokenizer interface in communication with a tokenizer for requesting and receiving a lexical analysis of said search text to yield tokens.

27. The system according to claim 25 wherein said means for locating comprises:

means for requesting reading of said search text as a character string to locate end information for said search level; and a controller for controlling requests for logical expression analysis according to detection of start information and location of end information.

28. The system according to claim 27 wherein said controller comprises:

means for pausing said logical expression analysis after start information for said search level has been detected; and means for resuming logical expression analysis after located end information.

29. The system according to claim 20 wherein said storage comprises:

a database interface in communication with a database for storing definition information for said parse level and storing definition information and held information of said search level as an entity related to said definition information for said parse level.

30. A system for constructing a tree data structure from a hierarchically structured text, said system comprising:

a display interface for receiving a command to parse a hierarchically structured text having a plurality of levels, each level within the plurality of levels being identified by definition information with start information and end information, to a requested depth;

a parser for searching a search text from the hierarchically structured text at a parse level to detect start information and locating end information for a search level, said parse level being one of the plurality of levels of the hierarchically structured text and being at least as high as said requested depth, said search level being lower than said parse level, wherein the parser generates a search tree that is parsed to the parse level;

a parse manager for coordinating said parse level, said search level and said search text used by said parser to search at an incrementally lower level of the plurality of levels of the hierarchically structured text until said parser level corresponds with the requested depth; and a storage for placing information on said parse level and information on said search level as related entities in the data structure.

wherein the parse manager, responsive to a determination that the parse level corresponds to the requested depth, the parse manager display the tree data structure at the display interface, wherein information within the tree data structure remains unparsed.

31. The system according to claim 30 wherein said parser comprises:

a plurality of parse functions, each of said plurality of parse function having a corresponding level corresponding to one of the plurality of levels of the hierarchically structured text.

32. The system according to claim 31 wherein each of said plurality of parse functions comprises:

means for searching said search text at said corresponding level to detect start information for a level lower than said corresponding level; and means for locating end information corresponding to detected start information.

33. The system according to claim 32 wherein said parser further comprises:

a parse coordinator for determining a function level being one of the plurality of levels of the hierarchically structured text corresponding to said parse level and invoking one of said plurality of parse function corresponding to said function level.

34. The system according to claim 30 wherein said parse manager comprises:

initializing means for determining a first level for said parse level for said parser, said first level being one of the two levels of the hierarchically structured text.

35. The system according to claim 32 wherein said parser further comprises:

a logical expression analyzer interface in communication with a logical expression analyzer for requesting and receiving a logical expression analysis of said search text to provide logical expressions, each logical expression representing a lexical expression from said search text;

and said means for searching comprises:

a comparator for comparing received logical expressions to expected definition information for said search level.

36. The system according to claim 35 wherein said logical expression analyzer interface comprises:

a tokenizer interface in communication with a tokenizer for requesting and receiving a lexical analysis of said search text to yield tokens.

37. The system according to claim 35 wherein said means for locating comprises:

means for requesting reading of said search text as a character string to locate end information for said search level; and a controller for controlling requests for logical expression analysis according to detection of start information and location of end information.

38. The system according to claim 37 wherein said controller comprises:

means for pausing said logical expression analysis after start information for said search level has been detected; and means for resuming logical expression analysis after located end information.

39. The system according to claim 30 wherein said storage comprises:

a database interface in communication with a database for storing definition information for said parse level and storing definition information and held information of said search level as an element related to said definition information for said parse level.

40. A computer readable medium having stored thereon computer-executable instructions for parsing a hierarchically structured text to a requested depth, the computer-executable instructions comprising:

receiving a command from a display interface to parse a hierarchically structured text having a plurality of levels, each level within the plurality of levels being identifiable by definition information with start information and end information, to a requested depth;

searching a search text from said hierarchically structured text at a parse level to detect start information for a search level, said parse level being one of the plurality of levels of the hierarchically structured text and being at least as high as said requested depth, said search level being lower than said parse level;

locating end information corresponding to detected start information after start information for said search level is detected;

holding information from said search text located between said detected start information and corresponding located end information;

determing whether the parse level corresponds to the requested depth, responsive to the parse level not corresponding to the requested depth, repeating said searching, said locating and said holding with held information as said search text and using said search level from said held information as said parse level; and responsive to the parse level corresponding to the requested depth, informing the display interface that parsing is complete, whether held information remains unparsed.

41. The computer readable medium according to claim 40 wherein said searching comprises:

determining a first level for said parse level for searching said search text.

42. The computer readable medium according to claim 41 wherein said searching further comprises:

setting the hierarchically structured text as said search text;

and said determining comprises:

setting said first level as a highest level of the plurality of levels of the hierarchically structured text.

43. The computer readable medium according to claim 40 wherein said searching comprises:

requesting logical expression analysis of said search text to provide logical expressions, each logical expression representing a lexical expression from said search text; and comparing received logical expressions to expected definition information for said search level.

44. The computer readable medium according to claim 43 wherein said requesting logical expression analysis of said search text to provide logical expressions comprises:

requesting a first logical expression;

and comparing received logical expressions to expected definition information for said search level comprises:

comparing said first logical expression to expected start information for said search level;

and said searching further comprises:

repeating said requesting logical expression analysis of said search text to provide logical expressions and said comparing received logical expressions to expected definition information for said search level to detect start information for said search level.

45. The computer readable medium according to claim 43 wherein said locating comprises:

controlling requests for logical expression analysis according to detection of start information and location of end information; and requesting reading of said search text as a character string to locate end information for said search level.

46. The computer readable medium according to claim 45 wherein said controlling requests for logical expression analysis according to detection of start information and location of end information comprises:

pausing said logical expression analysis after start information for said search level has been detected; and resuming logical expression analysis after located end information.

47. The computer readable medium according to claim 40 wherein said locating comprises:

requesting reading of said search text as a character string to locate end information for said search level after start information for said search level has been detected.

48. The computer readable medium according to claim 43 wherein said requesting logical expression analysis of said search text to provide logical expressions comprises:

requesting a lexical analysis of said search text to yield tokens; and wherein said comparing received logical expressions to expected definition information for said search level is performed in accordance with tokens.

49. The computer readable medium according to claim 40 wherein said searching further comprises:

storing definition information for said parse level in a database prior to searching;

and said holding comprises:

storing definition information and said held information of said search level in said database as an entity related to said definition information for said parse level.

50. The computer readable medium according to claim 49 wherein information for said parse level and said search level are stored as a tree data structure.

51. A computer readable medium having stored thereon computer-executable instructions for constructing a tree data structure from a hierarchically structured text, said computer-executable instructions comprising:

receiving a command from a display interface to parse a hierarchically structured text having a plurality of levels, each level within the plurality of levels being identifiable by definition information with start information and end information, to a requested depth;

placing information on a search text from the hierarchically structured text in the tree data structure;

searching said search text at a parse level to detect start information for a search level, said parse level being one of the plurality of levels of the hierarchically structured text, said search level being lower than said parse level;

locating end information corresponding to detected start information after start information for said search level is detected;

placing intermediate information from said search text between said detected start information and located end information in the tree data structure as an entity relating to saved information on said search text;

determining whether the parse level corresponds to the requested depth;

responsive to the parse level not corresponding to the requested depth, repeating said searching, said locating and said placing with saved intermediate information as said search text and using said search level from said saved intermediate text as said parse level; and responsive to the parse level corresponding to the requested depth, displaying the tree data structure at the display interface, wherein saved information within the tree data structure remains unparsed.

52. The computer readable medium according to claim 51 wherein said searching further comprises:

setting the hierarchically structured text as said search text;

and setting the hierarchically structured text as said search text comprises:

setting said parse level as a highest level of the plurality of levels of the hierarchically structured text.

53. The computer readable medium according to claim 51 wherein said searching further comprises:

requesting logical expression analysis of said search text to provide logical expressions, each logical expression representing a lexical expression from said search text; and comparing received logical expressions to expected definition information for said search level.

54. The computer readable medium according to claim 53 wherein said requesting logical expression analysis of said search text to provide logical expressions comprises:

requesting a first logical expression;

and said comparing received logical expressions to expected definition information for said search level comprises:

comparing said first logical expression to expected start information for said search level;

and said searching further comprises:

repeating said requesting logical expression analysis of said search text to provide logical expressions and said comparing received logical expressions to expected definition information for said search level to detect start information for said search level.

55. The computer readable medium according to claim 53 wherein said locating comprises:

controlling requests for logical expression analysis according to detection of start information and location of end information; and requesting reading of said search text as a character string to locate end information for said search level.

56. The computer readable medium according to claim 55 wherein said controlling requests for logical expression analysis according to detection of start information and location of end information comprises:

pausing said logical expression analysis after start information for said search level has been detected; and resuming logical expression analysis after located end information.

57. The computer readable medium according to claim 51 wherein locating comprises:

requesting reading of said search text as a character string to locate end information for said search level after start information for said search level has been detected.

58. The computer according to claim 53 said requesting logical expression analysis of said search text to provide logical expressions comprises:

requesting a lexical analysis of said search text to yield tokens; and wherein said comparing received logical expressions to expected definition information for said search level is performed in accordance with tokens.

59. A method of parsing a hierarchically structured text to a requested depth, the hierarchically structured text having two levels, each level being identifiable by definition information with start information and end information, the requested depth being one of the two levels, said method comprising:

searching a search text from said hierarchically structured text at a parse level to detect start information for a search level, said parse level being one of the two levels of the hierarchically structured text and being at least as high as said requested depth, said search level being lower than said parse level, said searching comprising:

requesting logical expression analysis of said search text to provide logical expressions, each logical expression representing a lexical expression from said search text; and comparing received logical expressions to expected definition information for said search level;

locating end information corresponding to detected start information after start information for said search level is detected, said locating comprising:

controlling requests for logical expression analysis according to detection of start information and location of end information; and requesting reading of said search text as a character string to locate end information for said search level;

holding information from said search text located between said detected start information and corresponding located end information; and repeating said searching, said locating and said holding with held information as said search text and using said search level from said held information as said parse level until said parse level corresponds with the requested depth.

* * * * *